(12) United States Patent
Chen et al.

(10) Patent No.: US 9,076,249 B2
(45) Date of Patent: Jul. 7, 2015

(54) HOLE FILLING METHOD FOR MULTI-VIEW DISPARITY MAPS

(71) Applicant: Industrial Technology Research Institute, Hsinchu (TW)

(72) Inventors: Hsiao-Wei Chen, Tainan (TW); Te-Mei Wang, Hsinchu (TW); Wei-Yi Lee, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 355 days.

(21) Appl. No.: 13/789,693

(22) Filed: Mar. 8, 2013

(65) Prior Publication Data

US 2013/0321405 A1    Dec. 5, 2013

Related U.S. Application Data

(60) Provisional application No. 61/654,063, filed on May 31, 2012.

(30) Foreign Application Priority Data

Sep. 6, 2012  (TW) .............................. 101132537 A

(51) Int. Cl.
  *G06T 15/00* (2011.01)
  *H04N 13/00* (2006.01)
(52) U.S. Cl.
  CPC ................ *G06T 15/00* (2013.01); *H04N 13/00* (2013.01); *H04N 13/0011* (2013.01)
(58) Field of Classification Search
  None
  See application file for complete search history.

(56) References Cited

U.S. PATENT DOCUMENTS

| 7,224,355 | B2 * | 5/2007 | Auberger et al. ............. 345/419 |
| 8,009,897 | B2 | 8/2011 | Xu et al. |
| 2011/0026809 | A1 | 2/2011 | Jeong et al. |
| 2011/0032341 | A1 | 2/2011 | Ignatov et al. |
| 2011/0115886 | A1 | 5/2011 | Nguyen et al. |
| 2012/0262543 | A1 * | 10/2012 | Lee et al. ........................ 348/43 |

FOREIGN PATENT DOCUMENTS

| CN | 1799266 | 7/2006 |
| CN | 101312540 | 11/2008 |

(Continued)

OTHER PUBLICATIONS

"Office Action of China Counterpart Application", issued on Nov. 21, 2014, p. 1-p. 7.
"Office Action of Taiwan Counterpart Application", issued on Aug. 18, 2014, p. 1-p. 12.

(Continued)

*Primary Examiner* — Kee M Tung
*Assistant Examiner* — Frank Chen
(74) *Attorney, Agent, or Firm* — Jianq Chyun IP Office

(57) ABSTRACT

A hole filling method for multi-view disparity maps is provided. At least one disparity map is respectively captured as a plurality of known views among a plurality of views for capturing an object. As for a plurality of virtual views among the views excluding the at least one known view, disparity maps of the virtual views are synthesized by sequentially using the disparity maps of the known views according to a distance of a virtual camera position or a transformed angle between each virtual view and each known view. Hole filling information of the disparity maps of other virtual views having the distances or the transformed angles smaller than that of the virtual view is used to fill holes in the synthesized disparity maps of the virtual views.

20 Claims, 11 Drawing Sheets

(56) References Cited

FOREIGN PATENT DOCUMENTS

| | | |
|---|---|---|
| CN | 102075779 | 5/2011 |
| TW | 200828182 | 7/2008 |
| TW | 200948043 | 11/2009 |
| TW | 201123072 | 7/2011 |
| TW | 201220248 | 5/2012 |

OTHER PUBLICATIONS

Emilie Bosc, et al., "Towards a New Quality Metric for 3-D Synthesized View Assessment", IEEE, Journal of Selected Topics in Signal Processing, vol. 5, No. 7, Nov. 2011, pp. 1332-1343.
Aljoscha Smolic, et al., "Three-Dimensional Video Postproduction and Processing", IEEE, Proceedings of the IEEE, vol. 99, No. 4, Apr. 2011, pp. 607-625.
Kyuyoung Hwang, et al, "Novel Multi-view Generation Framework for 3D Displays", SPIE—IS&T, vol. 8288, 2012, pp. 828821-1-828821-10.
Seona Kim, et al "A Layered Inpainting Method for Virtual View Synthesis", SPIE—IS&T, vol. 8288, 2012, pp. 8288A-1-8288A-9.
Patrick Ndjiki-Nya, et al, "Depth Image-Based Rendering with Advanced Texture Synthesis for 3-D Video", IEEE, Transactions on Multimedia, vol. 13, No. 3, Jun. 2011, pp. 453-465.

\* cited by examiner

HOLE FILLING METHOD FOR MULTI-VIEW DISPARITY MAPS

CROSS-REFERENCE TO RELATED APPLICATION

This application claims the priority benefits of U.S. provisional application Ser. No. 61/654,063, filed on May 31, 2012, and Taiwan application serial no. 101132537, filed on Sep. 6, 2012. The entirety of each of the above-mentioned patent applications is hereby incorporated by reference herein and made a part of this specification.

TECHNICAL FIELD

The technical field relates to a hole filling method for disparity maps, and more particularly, to a hole filling method for multi-view disparity maps.

BACKGROUND

Along with the development of 3D TV technology, the technique of generating multi-view images by using a small number of 2D images has become increasingly important. Nowadays, many techniques are developed for generating virtual view images, and those techniques can be categorized into two groups. The first group is to generate the images of other virtual views based on one image, and the other group is to generate the images of the virtual views within an angle formed by two images by using these two images. The virtual views simulated by using each of aforementioned techniques with small unknown regions due to the small angle transformation. However, the image content displayed on an auto-stereoscopic 3D TV is required to simulate the large angle transformation of virtual views and accordingly generate very large unknown regions, which is not acceptable to the techniques mentioned above. To generate lifelike virtual view images, besides image simulation, the processing of disparity map is also very important, in which whether the values of the pixels in the disparity map are correct determines whether an image can be projected to the correct position, and the hole filling of unknown regions in the disparity map of virtual views also affects the correctness of image information.

Most existing hole-filling techniques are adapted to filling holes in small unknown region generated through small angle transformation. When the transformed angle increases, the area of the unknown region also increases. In some case, the left-right relation of the foreground and the background may be changed after the large angle transformation. As a result, there is no correct disparity value around the unknown region and only incorrect value can be captured from adjacent regions. For example, FIG. 1 illustrates a disparity map obtained after large angle transformation. Referring to FIG. 1, the portion of lighter color represents that the object is closer to the capturing position, while the portion of darker color represents that the object is farther to the capturing position. The unknown region 18 (in black color) is originally the background of the plaster model 14, and the disparity of this region should be the same as the background 12 of the disparity map. However, the unknown region 18 produced through the view transformation is located between the plaster model 14 and the triangular pyramid 16. The unknown region 18 is completely surrounded by the foreground and therefore is not connected to the correct background.

Additionally, in a general hole-filling method, holes at different virtual views are respectively filled. Thus, a same spot in the 3D space may be filled with different disparity value at different virtual views. As a result, the 3D effect is affected.

SUMMARY

The disclosure provides a hole filling method for multi-view disparity maps. The hole filling method is adapted to an electronic device. In the hole filling method, at least one disparity map is respectively captured as at least one known view image among a plurality of views for capturing an object. As for a plurality of virtual views among the views excluding the known view, a disparity map of each of the virtual views is sequentially synthesized by using the disparity map of the known view according to a distance of a virtual camera position or a transformed angle between the virtual view and the known view. Then, holes in the synthesized disparity map of the virtual view are filled by using a filling information of the disparity map of each of the other virtual views having the distance or the transformed angle smaller than the distance or the transformed angle of the virtual view.

The disclosure provides a hole-filling method for multi-view disparity maps, which is adapted to an electronic device. In the hole filling method, at least one disparity map is respectively captured as at least one known view image. As for a plurality of virtual views among the views excluding the known views, a disparity map of each of the virtual views is synthesized by using the disparity map of the known view according to a distance of a virtual camera position or a transformed angle between the virtual view and the known view. The holes in the synthesized disparity map of the virtual view are filled. The projections of images of the virtual views are transformed into orthographic projections in a horizontal direction and perspective projections in a vertical direction, and the holes in the images of the transformed virtual views are filled.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The disclosure provides a hole filling method for multi-view disparity maps, in which disparity maps of virtual views in large angle transformation can be processed, and the consistency of the disparity value of hole filling in disparity maps in the 3D space can be kept, so that an optimal 3D visual effect can be achieved. The disclosure is dedicated to transforming disparity maps of one or more different views into disparity maps of multiple virtual views with a large transformed angle and synthesizing the content of a 3D image by using those disparity maps. Because only limited disparity maps are input, unknown regions are produced after the views of these disparity maps are transformed. To ensure the spatial consistency when filling unknown regions in these disparity maps of virtual views, a propagation map is defined in the disclosure for storing information of filled unknown regions.

Figure 1:
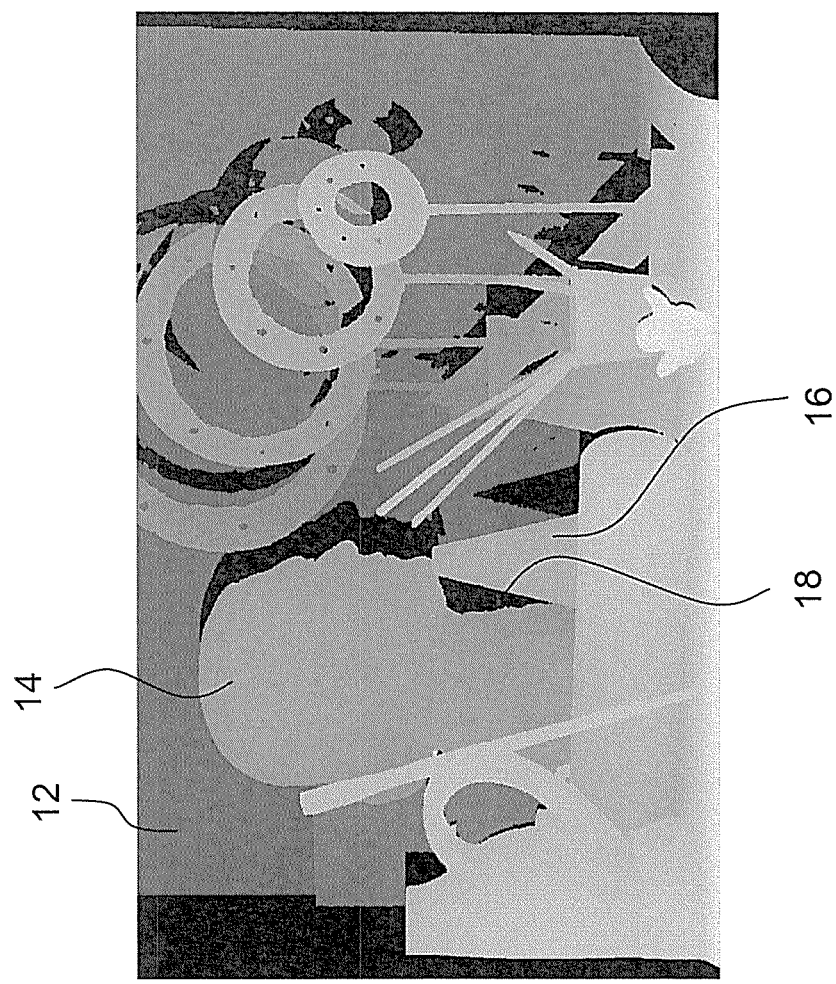
FIG. 1 illustrates a disparity map generated in a conventional hole filling technique.
Figure 2:
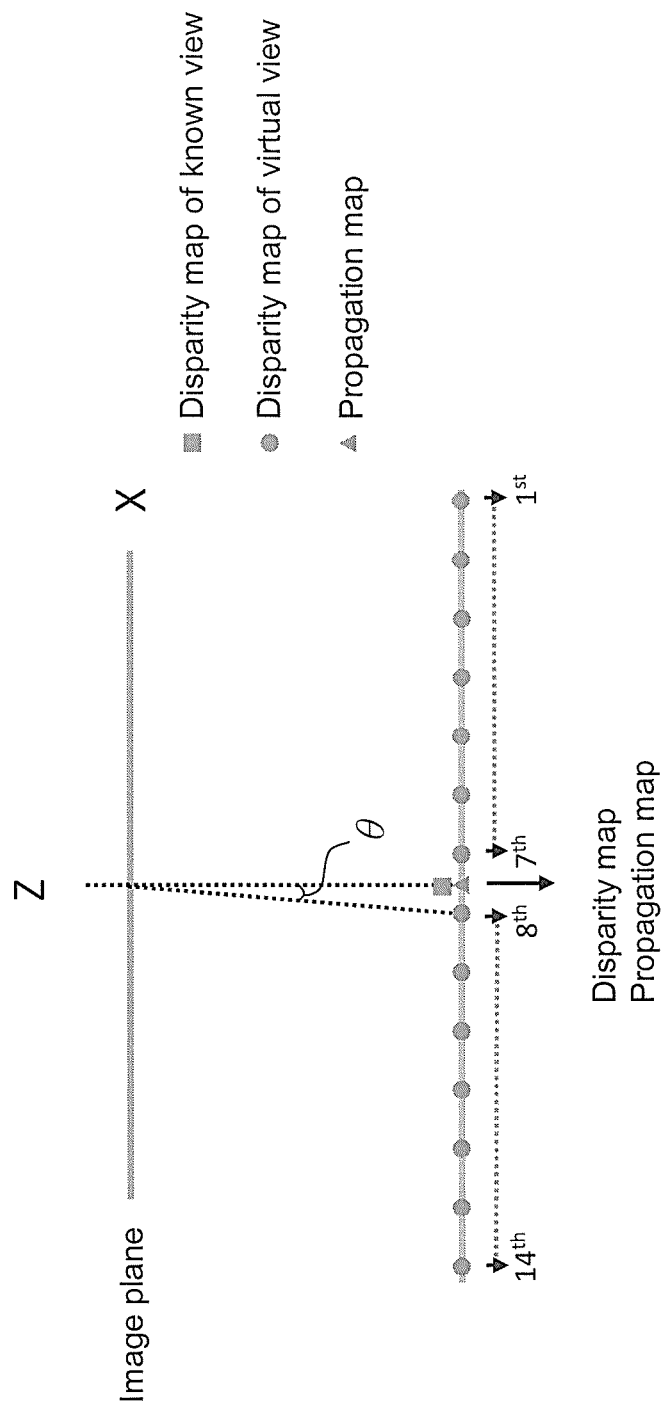
FIG. 2 is a top view of simulating other virtual views by using a single known disparity map according to an embodiment of the disclosure.
Figure 3:
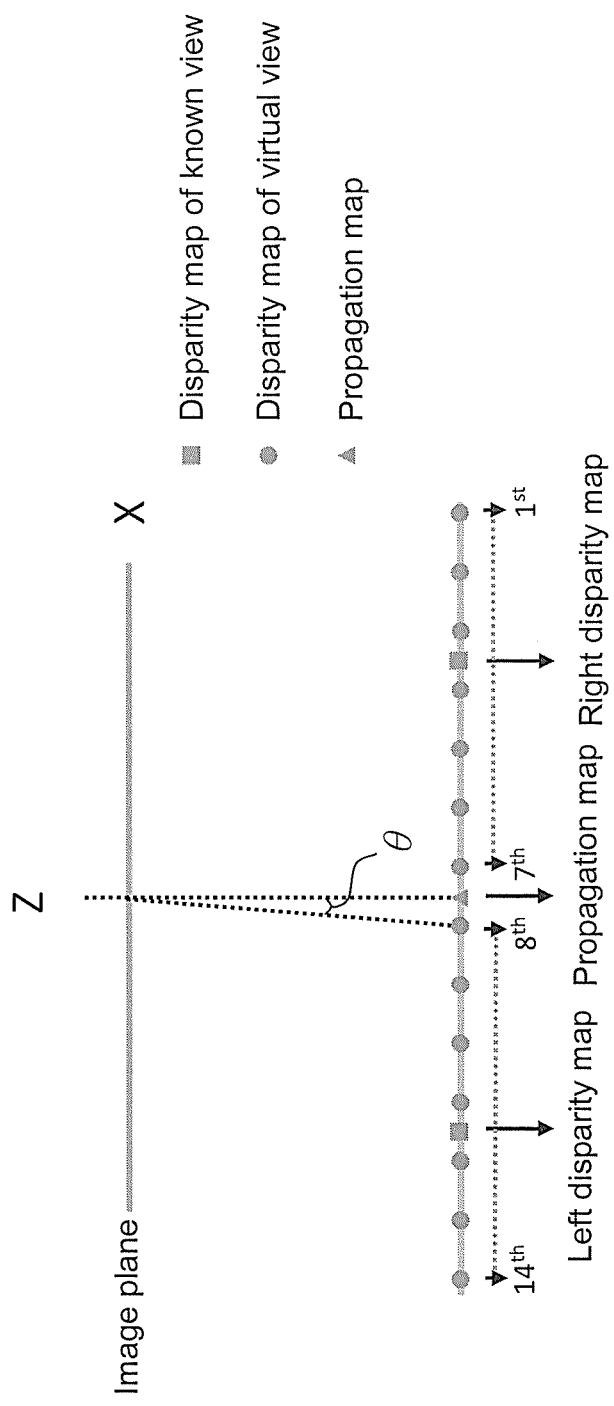
FIG. 3 is a top view of simulating other virtual views by using two known disparity maps according to an embodiment of the disclosure.

FIG. 2 is a top view of simulating other virtual views by using a single known disparity map according to an embodiment of the disclosure. FIG. 3 is a top view of simulating other virtual views by using two known disparity maps according to an embodiment of the disclosure. In the present embodiment, a propagation map is fixed at a specific view (for example, the triangular points in FIG. 2 and FIG. 3) or at a view opposite to a center of the image. Besides, in the present embodiment, 14 virtual views are simulated in FIG. 2 and FIG. 3, in which the round points indicate the virtual views of the disparity maps to be simulated (output), and the square points indicate the views of the known disparity maps (input). In following embodiments, two known disparity maps are taken as an example.

The greater the transformed angle of the virtual view to be simulated is, the greater the unknown region is produced, and the left-right relation of foreground and background objects may be changed. In this case, there may be no correct value around the unknown region can be referenced. Thus, in the technique provided by the disclosure, the disparity maps of those virtual views having smaller transformed angles are first processed, in which the transformed angle is the angle formed by the virtual view and the vertical line at the center of the image; for example, the parameter θ is the transformed angle of the $8^{th}$ virtual view. Thus, the disparity map of virtual views are filled in the sequence of 7, 8, 6, 9, . . . , 1, and 14. A disparity map of virtual view having a relatively small transformed angle is first filled because it has a relatively small unknown region and accordingly filling the holes with adjacent disparity values offers a relatively high accuracy. Besides determining the processing sequence based on the transformed angles of the virtual views, in another embodiment, the processing sequence may also be determined based on the distances (starting from the shortest distance) between the camera position of the virtual view and any known view (i.e., the distances between the round points and any square points in FIG. 3). This processing sequence starts from the virtual view having least unknown regions, so as to increase the accuracy of the filling operation.

Figure 4:
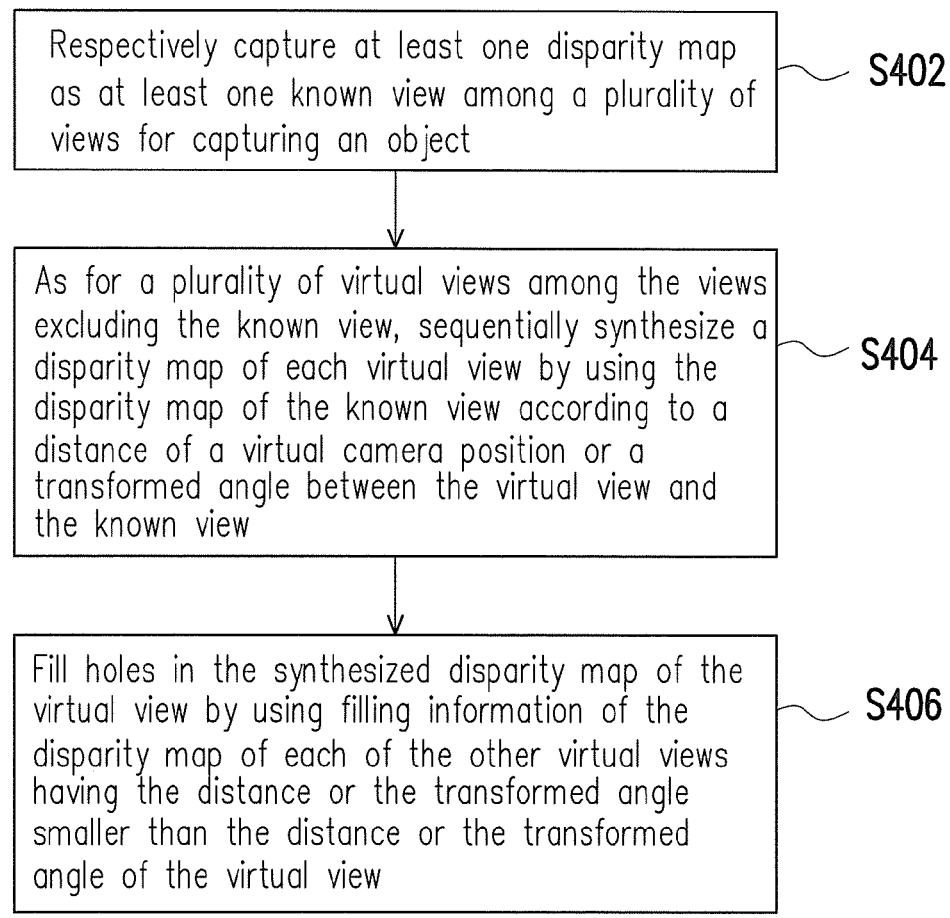
FIG. 4 is a flowchart of a hole filling method for multi-view disparity maps according to an embodiment of the disclosure.

FIG. 4 is a flowchart of a hole filling method for multi-view disparity maps according to an embodiment of the disclosure. Referring to FIG. 4, the hole filling method in the present embodiment is adapted to an electronic device. The electronic device may be a computer, a workstation, a server, or any other device having a microprocessor, a digital signal processor (DSP), a programmable controller, application specific integrated circuits (ASIC), or a programmable logic device (PLD). The electronic device can be configured to execute the hole filling method provided by the present embodiment. Below, the hole filling method in the present embodiment will be explained in detail.

First, the electronic device respectively captures at least one disparity map as the known view among a plurality of views for capturing an object (step S402) and for a plurality of virtual views among the views excluding the known view, sequentially synthesizes the disparity map of each virtual view by using the disparity map of the known view according to the distance of virtual camera position or the transformed angle between the virtual view and the known view (step S404). Herein the electronic device may first transform (or project) the disparity map of the known view into the virtual view to synthesize the disparity map of the virtual view.

It should be noted that during the process of synthesizing the disparity map, as for each pixel in the disparity map of the virtual view, the electronic device serves the pixel value of a pixel having a relatively large disparity value (small depth) among the corresponding pixels. Herein if the pixel has no corresponding disparity value (depth information) in these disparity maps, the electronic device marks the pixel as a hole (unknown region).

Finally, the electronic device fills holes (the unknown region) in the synthesized disparity map of the virtual view by using filling information of the disparity maps of other virtual views which have the distances or transformed angles smaller than that of the current virtual view (step S406). Herein regarding the first processed virtual view, because no previous filling information is available when filing the unknown region of the disparity map of the virtual view, the disparity map of the known view after view transformation is directly used to fill the unknown region by hole filling method. The hole filling technique being adopted is not limited herein. For example, a general hole filling technique such as filling the unknown region by using smaller disparity value (larger depths) on the left and right of the unknown region may be adopted and accordingly a good result can be achieved.

It should be noted that after obtaining the disparity map of the virtual view having smaller transformed angle and filling the holes, the obtained disparity maps can be used along with the disparity map of the known view for synthesizing the disparity map of a virtual view having a larger transformed angle, which is explained in detail below with reference to another embodiment.

Figure 5:
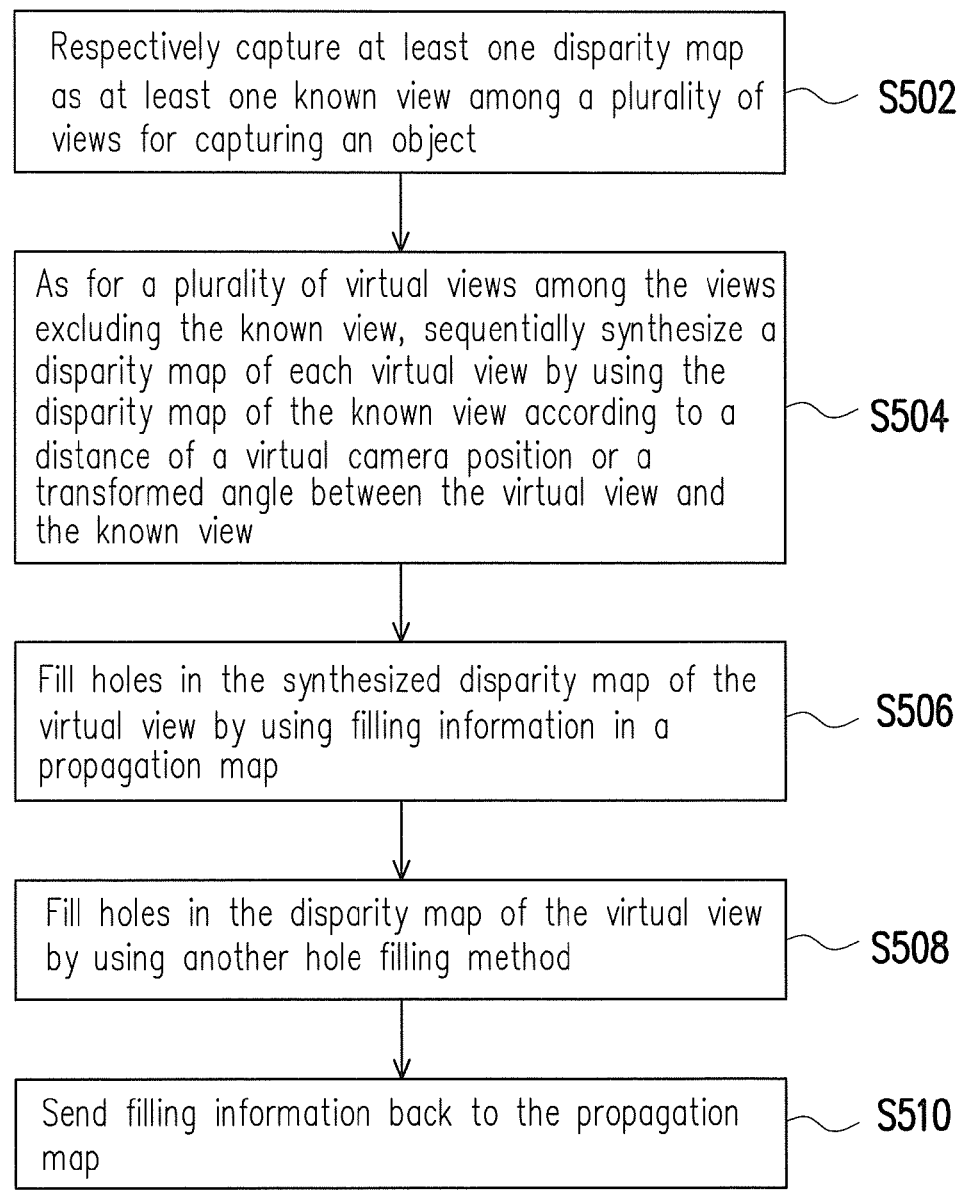
FIG. 5 is a flowchart of a hole filling method for multi-view disparity maps according to an embodiment of the disclosure.

FIG. 5 is a flowchart of a hole filling method for multi-view disparity maps according to an embodiment of the disclosure. Referring to FIG. 5, the hole filling method in the present embodiment is adapted to an electronic device. Below, the hole filling method in the present embodiment is described in detail.

First, the electronic device respectively captures at least one disparity map as the known view among a plurality of views for capturing an object (step S502) and for a plurality of virtual views among the views excluding the known view, sequentially synthesizes the disparity map of each virtual view by using the disparity map of the known view according to a distance of a virtual camera position or a transformed angle between the virtual view and the known view (step S504). The contents of foregoing steps S502-S504 are the same as or similar to those of steps S402-S404 in the embodiment described above and therefore are not described herein.

Unlike the embodiment described above, in the present embodiment, every time when the electronic device fills the holes (the unknown region) in the disparity map of a virtual view, the electronic device further records the filling information for filling the unknown region into a propagation map. Thus, when synthesizing the disparity map of the next virtual view, the electronic device accesses the propagation map recorded when the disparity maps of other virtual views are filled and fills the holes (the unknown region) in the synthesized disparity map of the virtual view with the filling information in the propagation map (step S506). Additionally, the electronic device may fill holes in the disparity map of the virtual view by using another hole filling method (step S508). For example, the electronic device can fill the holes (the unknown region) by using the neighboring pixels around the unknown region. Finally, the electronic device sends all the filling information back into the propagation map (step S510) so that those filling information can be used for filling holes in the disparity map of next processing virtual view. Herein the electronic device may transform the propagation map into next processing virtual view for filling holes in the disparity map of next processing virtual view. Besides, when the holes in a disparity map are filled (step S508), the electronic device transforms the filling information into the predetermined view and stores it in the propagation map. The camera position of predetermined view may be in the center of those camera positions of all the virtual views or the adjacent to the center of those camera positions of all the virtual view. However, the invention is not limited thereto.

Figure 6:
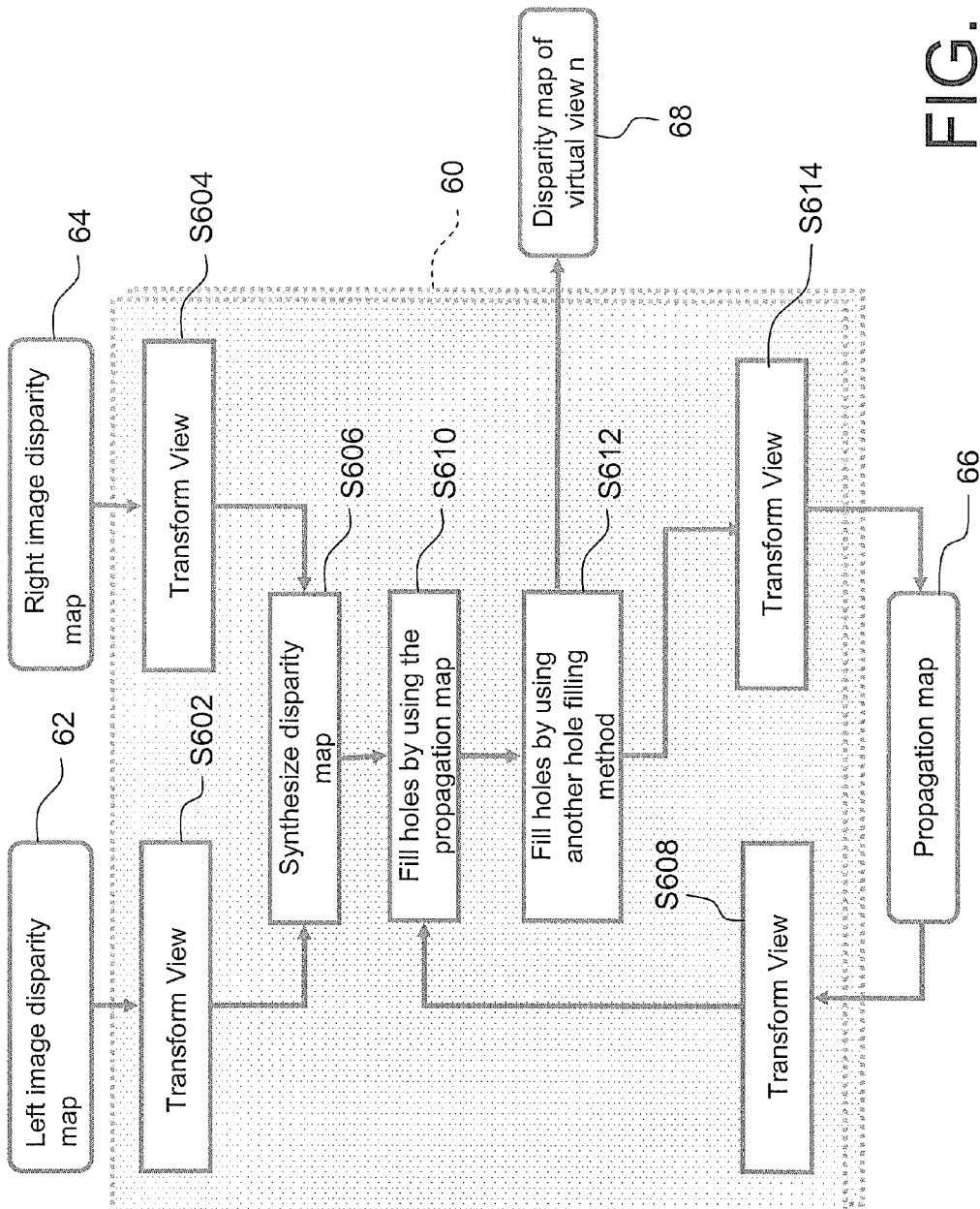
FIG. 6 is a flowchart of a hole filling method for multi-view disparity maps according to an embodiment of the disclosure.

FIG. 6 is a flowchart of a hole filling method for multi-view disparity maps according to an embodiment of the disclosure. Referring to FIG. 6, in the procedure 60 of the present embodiment, an electronic device respectively transforms is a left disparity map 62 and a right disparity map 64 of the known view into a virtual view n to be simulated (steps S602 and S604) to obtain a left disparity map and a right disparity map after the view transformation. Then, the electronic device merges the left disparity map and the right disparity map after the view transformation into a disparity map of the virtual view to be simulated (step S606) and fills the holes (the unknown regions) in the synthesized disparity map of the virtual view by using the filling information in the disparity maps of previously processed virtual views. Herein the electronic device may first transform a propagation map 66 of the predetermined view into the processing view (step S608) and then fill the holes (the unknown region) in the synthesized disparity map of the virtual view by using the transformed propagation map 66 (step S610).

Thereafter, the electronic device fills the holes in the disparity map of the virtual view by using another hole filling method (step S612). For example, the electronic device uses the neighboring pixels around the unknown region in the disparity map of this virtual view to fill the holes (the unknown region), so as to obtain a disparity map 68 of the virtual view n. Herein the electronic device may further transform the filling information in the disparity map of this virtual view into the predetermined view (step S614) and update the propagation map 66 with the transformed filling information, so that the filling information can be used for filling the disparity map of the next processing virtual view.

Similarly, when the disparity map of the next virtual view is processed, combined the disparity map of processing virtual view and the transformed propagation map to reduce the area of the unknown region, and the rest unknown regions are filled by using a hole filling method. Similarly, the current filling information needs to be sent back into the propagation map to be accumulated. Subsequently, each disparity map of virtual view will be processed in the same way.

Figure 7:
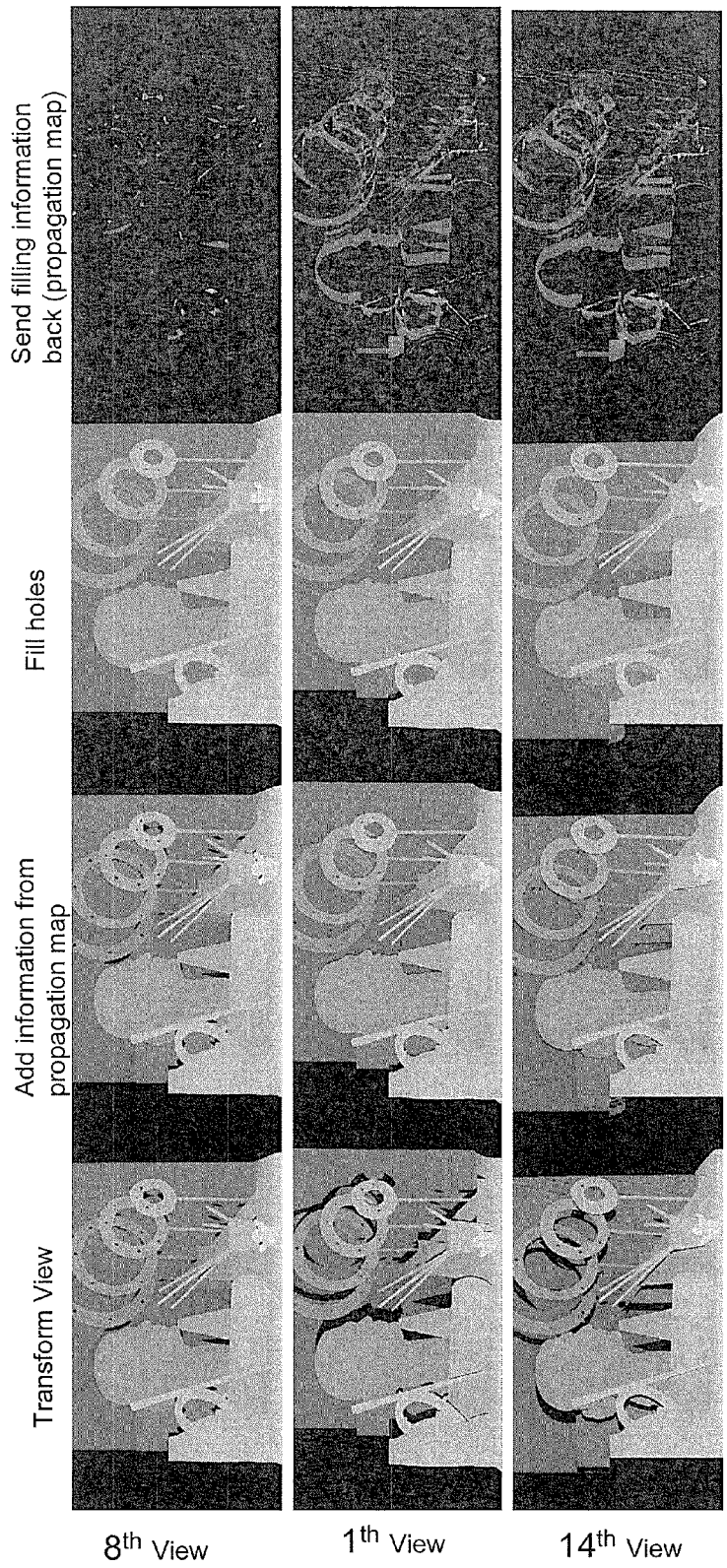
FIG. 7 illustrates an example of a hole filling method for multi-view disparity maps according to an embodiment of the disclosure.

In short, the procedure described above can be generalized into four steps, such as transforming the view of the known disparity maps, filling with the previous filling information of the propagation map, filling unknown regions, and storing the filling information in the propagation map. FIG. 7 illustrates an example of a hole filling method for multi-view disparity maps according to an embodiment of the disclosure. Referring to FIG. 7, in the present embodiment, the disparity maps of the $8^{th}$, the $1^{st}$, and the $14^{th}$ virtual view are respectively processed through aforementioned four steps, and the results are respectively illustrated.

Figure 8:
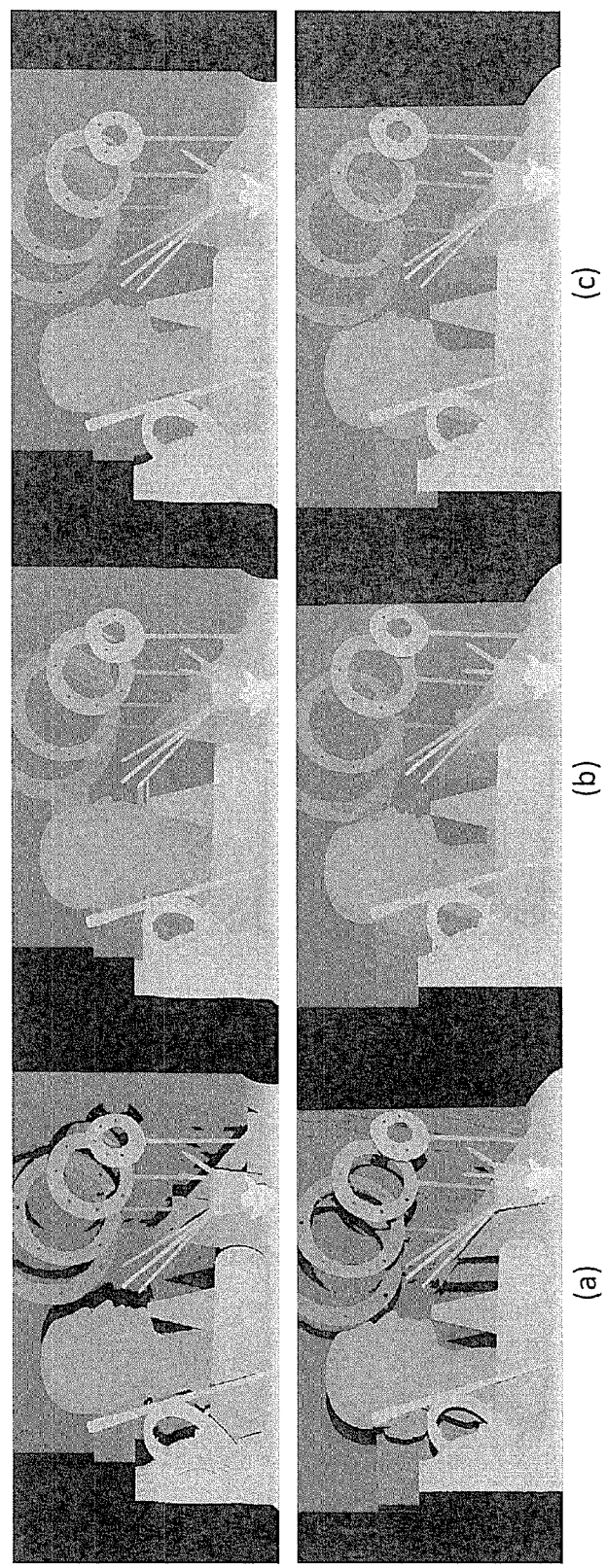
FIGS. 8(a)-8(c) illustrate the results of a hole filling method according to an embodiment of the disclosure and other hole filling methods side by side.

As described above, in the hole filling method provided by the disclosure, the problem of unknown regions cannot be filled correctly when the foreground object and the background object are misaligned due to overlarge transformed angles of virtual views won't be produced. FIGS. 8(a)-8(c) illustrate the results of a hole filling method according to an embodiment of the disclosure and other hole filling methods side by side. FIG. 8(a) illustrates the images before hole filling, in which the black portions are unknown regions. FIG. 8(b) illustrates the images after hole filling through another hole filling method. FIG. 8(c) illustrates an image after hole filling through the hole filling method provided by the disclosure.

Figure 9:
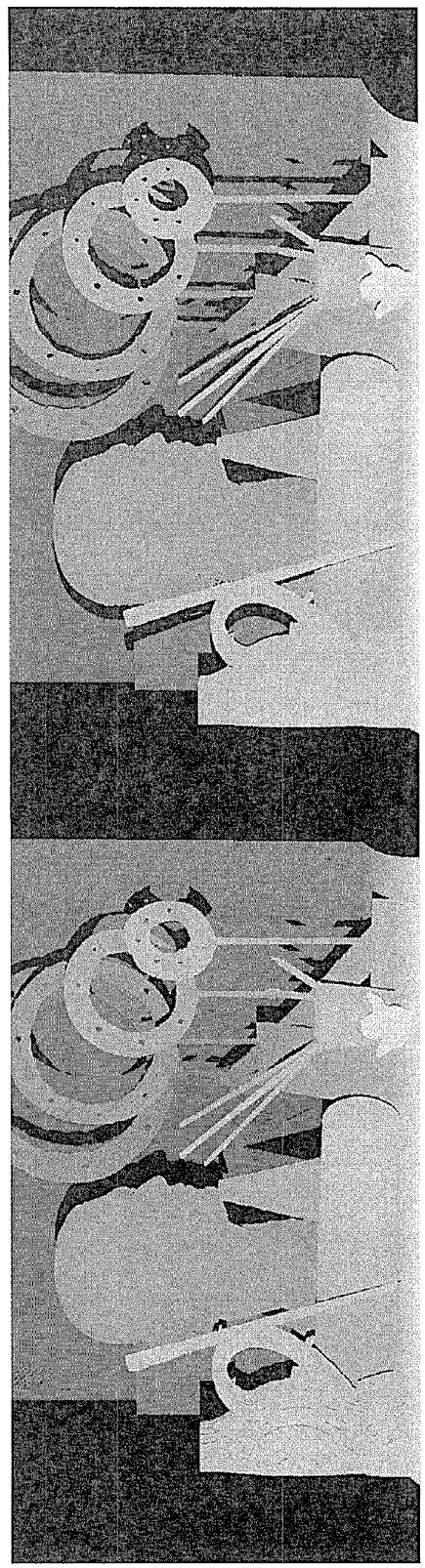
FIGS. 9(a)-9(b) illustrate different disparity maps generated in two projection modes at the same virtual view according to an embodiment of the disclosure.

Because consistent filling information is used for filling the disparity maps of all the virtual views, the content of a 3D image can be synthesized subsequently. Regarding the virtual views to be generated by an existing 3D TV (for example, a multi-view 3D display), the projections thereof in both horizontal and vertical directions are perspective projections (referred to as PP projections thereinafter). Such a projection technique is the same as that adopted in the disclosure. The virtual views to be generated by another type of 3D TV (for example, a HPO II 3D display) have orthographic projections in the horizontal direction and perspective projections in the vertical direction (referred to as OP projections thereinafter). Through the OP projection technique, the unknown regions in disparity map or image of the virtual view have different rules as unknown regions in disparity map or image of the virtual view generated due to PP projection. For example, FIGS. 9(a)-9(b) illustrate different disparity maps generated in two projection modes at the same camera position of the virtual view according to an embodiment of the disclosure, in which FIG. 9(a) illustrates a disparity map of a virtual view produced by a PP projection, and FIG. 9(b) illustrates a disparity map of the same virtual view as PP projection produced by an OP projection.

Thereby, the unknown regions of such a virtual view needs to be filled in two stages. In the first stage, the unknown regions produced during view transformation are processed, and in the second stage, the unknown regions produced due to different projection modes are processed. Below, this hole filling method is described in detail with reference to an embodiment.

Figure 10:
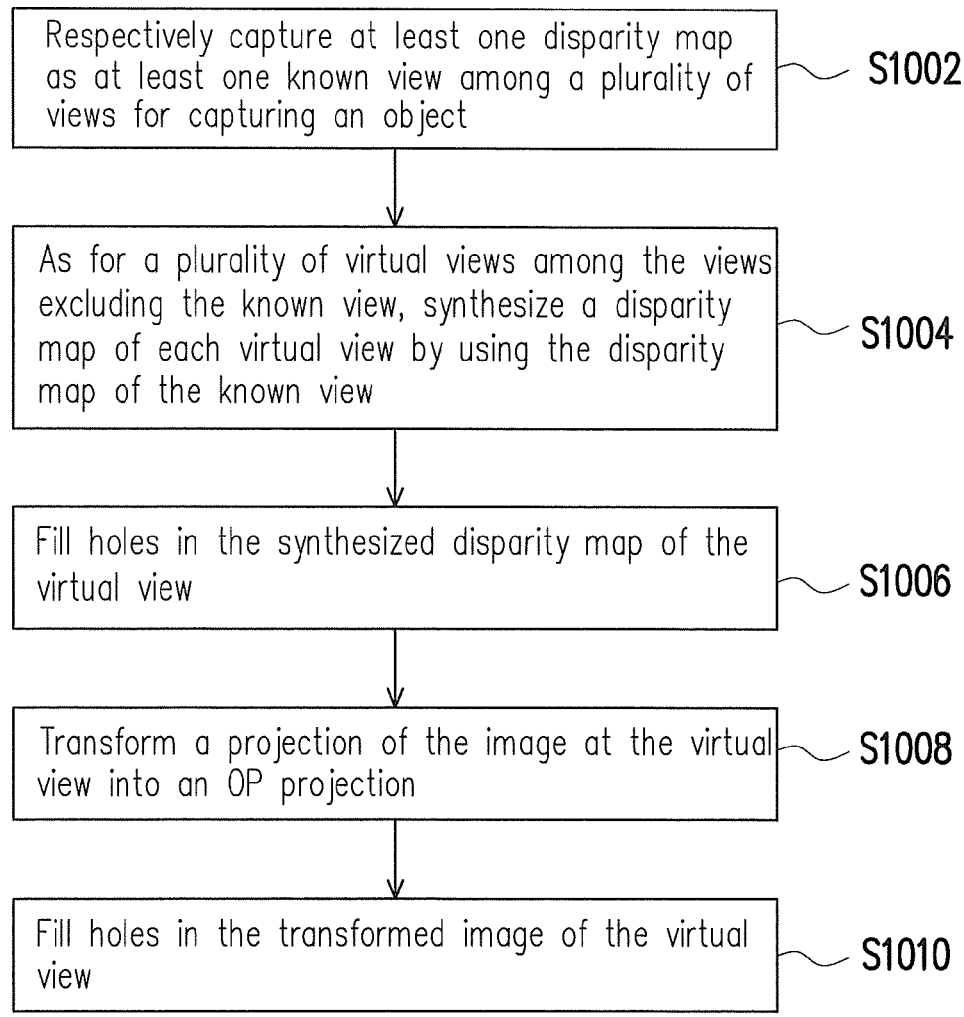
FIG. 10 is a flowchart of a hole filling method for multi-view disparity maps according to an embodiment of the disclosure.

FIG. 10 is a flowchart of a hole filling method for multi-view disparity maps according to an embodiment of the disclosure. Referring to FIG. 10, the hole filling method in the present embodiment is adapted to an electronic device. Below, the hole filling method in the present embodiment is described in detail.

First, the electronic device respectively captures at least one disparity map as the known view (step S1002). As for a plurality of virtual views, the electronic device synthesizes the disparity map of each virtual view by using the disparity map of the known view (step S1004). Besides, the electronic device fills holes (unknown regions) in the synthesized disparity map of the virtual view (step S1006). Herein when the electronic device synthesizes a disparity map and fills the holes, it may adopt the technique described in foregoing embodiment. Namely, the electronic device sequentially synthesizes the disparity map of each virtual view by using the disparity map of the known view according to the camera position of each virtual view, and the electronic device fills the holes (unknown regions) in the synthesized disparity map of the virtual view by using filling information in disparity maps of other virtual views that have the transformed angles or distance between the camera position of the known view and the virtual view smaller than that of the current virtual view. The implementation details of this method have been described in foregoing embodiments and therefore will not be described herein.

After the disparity map at each virtual view is generated, in order to generate the desired 3D image, the electronic device transforms the disparity map of each virtual view from PP projection into OP projection (step S1008) and fills the holes (the unknown regions) in the disparity map (step S1010). After that, the disparity map at the virtual views can be used for synthesizing a 3D image.

To be specific, to generate an image at a virtual view, the disparity map of the virtual view has to be obtained first, and the accuracy of the disparity map is a very important factor in the subsequent synthesis of the virtual view image. Thus, in the disclosure, a plurality of disparity maps of the virtual view having large transformed angles and extremely high simulation accuracy are provided and subsequently used for simulating images of virtual views, and eventually, all the simulated images of virtual views are synthesized into a 3D image.

Figure 11:
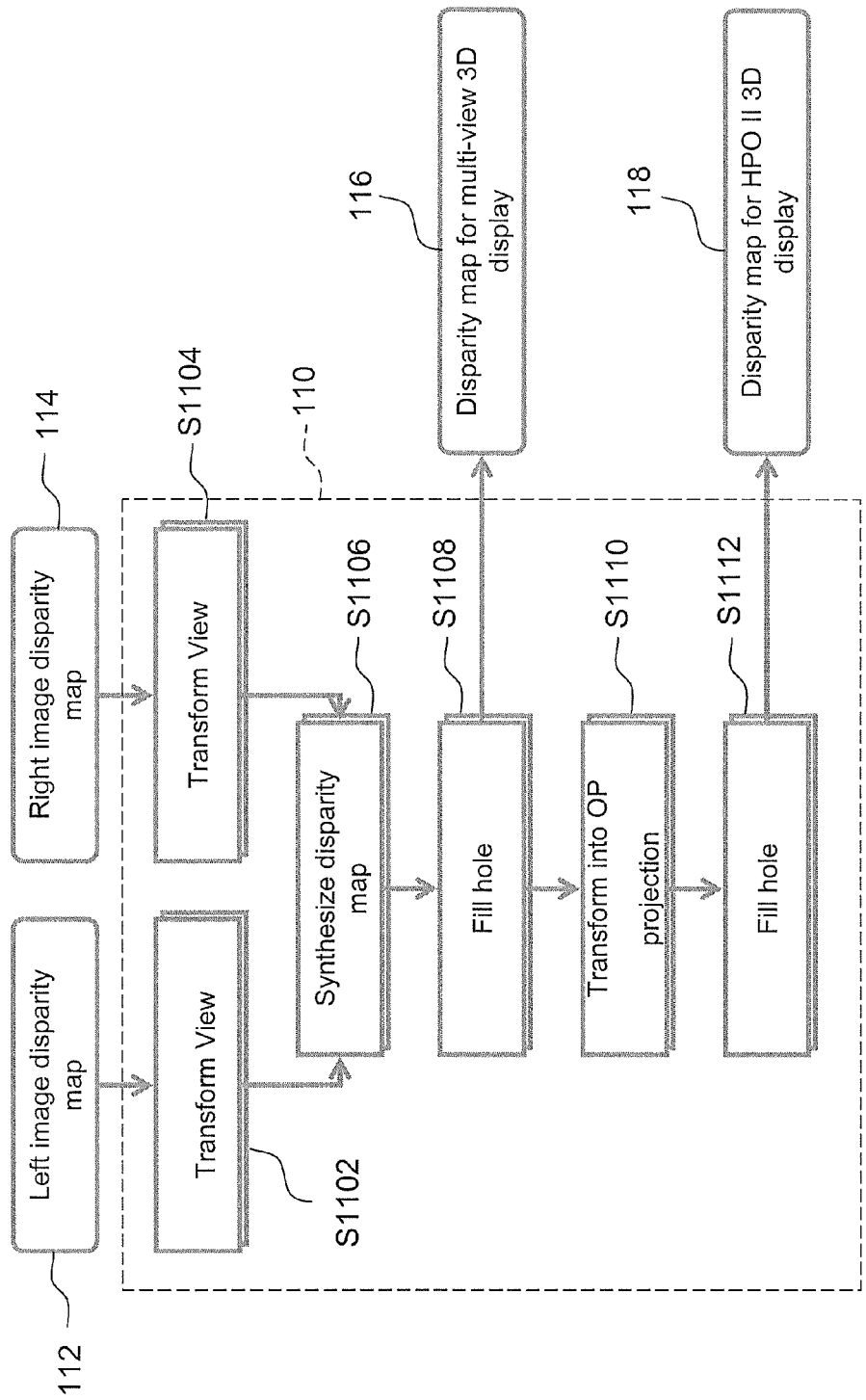
FIG. 11 is a flowchart of a hole filling method for multi-view disparity maps according to an embodiment of the disclosure.

FIG. 11 is a flowchart of a hole filling method for multi-view disparity maps according to an embodiment of the disclosure. Referring to FIG. 11, in the procedure 110 of the present embodiment, an electronic device respectively transforms a left disparity map 112 and a right disparity map 114 of a known view into a virtual view to be simulated (steps S1102 and S1104) to obtain a left disparity map and a right disparity map after view transformation. Then, the electronic device merges the left disparity map and the right disparity map after view transformation into a disparity map of the virtual view to be simulated (step S1106) and fills the holes (the unknown regions) in the synthesized disparity map of the virtual view (step S1108). Herein when the electronic device fills the holes, it may adopt the technique described in foregoing embodiment. Herein the disparity maps are still transformed by using PP projections, and the hole filling process is carried out after the transformed disparity maps are merged, so that a disparity map 116 of multiple virtual views can be generated and served as an input of a multi-view 3D display.

On the other hand, the electronic device further transforms the disparity maps of the virtual views from PP projection into OP projections (step S1110) and fills the holes (the unknown regions) in the transformed disparity maps of the virtual views (step S1112). As a result, the disparity maps of the virtual views are disparity maps conforming to the standard of a HPO II 3D display. To be specific, to generate an input of a HPO II 3D display, the virtual views need to be transformed from PP projection into OP projection. However, such transformation still produces holes in some unknown regions. Such unknown regions are filled by using a hole filling method to obtain a disparity map 118 of multiple virtual views which are used as the input of a HPO II 3D display.

As described above, the disclosure provides a hole filling method for multi-view disparity maps. According to the disclosure, the disparity maps of the known view are first transformed into a plurality of virtual views. By taking the spatial consistency into consideration, all the hole filling information used for filling holes at each virtual view is stored in a propagation map of a predetermined view. Among multiple virtual views, the unknown regions in the disparity map of the virtual view having the smallest transformed angle or the shortest distance to a known view are first filled before those of the other virtual views. Herein the filling information previously used for filling other virtual views is used for filling the unknown regions of a current processing virtual view so that the holes in unknown regions produced during the view transformation of the disparity map can be filled. In addition, the disclosure can generate 3D disparity maps in different projection modes. In the first stage, the input disparity map is first transformed into the disparity map of the corresponding virtual view, and then the holes (the unknown regions) produced during the view transformation are filled. In the second stage, the projection mode of the disparity map is transformed and then the holes are filled, so that the holes in the unknown regions produced when the projection mode is transformed can be filled.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A hole filling method for multi-view disparity maps, adapted to an electronic device, the hole filling method comprising:
respectively capturing at least one disparity map as at least one known view among a plurality of views for capturing an object;
as for a plurality of virtual views among the views excluding the known view, sequentially synthesizing a disparity map of each of the virtual views by using the disparity map of the known view according to a distance of a virtual camera position or a transformed angle between the virtual view and the known view; and
filling holes in the synthesized disparity map of the virtual view by using a filling information of the disparity map of each of the other virtual views having the distance or the transformed angle smaller than the distance or the transformed angle of the virtual view.

2. The hole filling method according to claim 1, wherein the step of synthesizing the disparity map of the virtual view by using the disparity map of the known view comprises:
obtaining at least one disparity map of the known view;
transforming the view of the at least one disparity map to the virtual view; and
synthesizing the at least one disparity map of the transformed view to generate the disparity map of the virtual view.

3. The hole filling method according to claim 2, wherein the step of synthesizing the at least one disparity map of the transformed view to generate the disparity map of the virtual view comprises:
as for each pixel in the disparity map of the virtual view, serving a pixel value of a pixel having a relatively small depth among corresponding pixels in the at least one disparity map as a pixel value of the pixel in the disparity map, wherein when the pixel has no corresponding depth, the pixel is marked as the hole.

4. The hole filling method according to claim 1, wherein the step of filling the holes in the synthesized disparity map of the virtual view by using the filling information of the disparity map of the other virtual view having the distance or the transformed angle smaller than the distance or the transformed angle of the virtual view further comprises:
recording the filling information of the holes in the synthesized disparity map of the virtual view into a propagation map.

5. The hole filling method according to claim 4, wherein the step of filling the holes in the synthesized disparity map of the virtual view by using the filling information of the disparity map of the other virtual view having the distance or the transformed angle smaller than the distance or the transformed angle of the virtual view comprises:
accessing the propagation map recorded when the disparity map of the other virtual view is filled, and filling the filling information in the propagation map into the holes in the synthesized disparity map of the virtual view.

6. The hole filling method according to claim 5, wherein the step of filling the holes in the synthesized disparity map of the virtual view by using the filling information of the disparity maps of the other virtual views having the distance or the transformed angles smaller than the distance or the transformed angle of the virtual view further comprises:
filling pixel values of pixels at a depth around the holes into the holes.

7. The hole filling method according to claim 4, wherein the step of recording the filling information of the holes in the synthesized disparity map of the virtual views into the propagation map further comprises:
transforming a view of the propagation map into a predetermined view.

8. The hole filling method according to claim 7, wherein the step of accessing the propagation map recorded when the disparity map of the other virtual view is filled further comprises:
transforming the view of the propagation map into the virtual view to fill the filling information in the transformed propagation map into the holes in the synthesized disparity map of the virtual view.

9. The hole filling method according to claim 7, wherein the predetermined view is an opposite view or a view opposite to an adjacent image center.

10. The hole filling method according to claim 1, wherein the transformed angle is an angle formed by the virtual view and an image center.

11. A hole filling method for multi-view disparity maps, adapted to an electronic device, the hole filling method comprising:
respectively capturing at least one disparity map as at least one known view among a plurality of views for capturing an object;
as for a plurality of virtual views among the views excluding the known view, synthesizing a disparity map of each of the virtual views by using the disparity map of the known view according to a distance of a virtual camera position or a transformed angle between the virtual view and the known view;
filling holes in the synthesized disparity map of the virtual view;
transforming projections of images of the virtual views into orthographic projections in a horizontal direction and perspective projections in a vertical direction; and
filling holes in the images of the transformed virtual views.

12. The hole filling method according to claim 11, wherein the step of as for the virtual views among the views excluding the known view, synthesizing the disparity map of each of the virtual views by using the disparity map of the known view comprises:
as for the virtual views among the views excluding the known view, synthesizing the disparity map of the virtual view by using the disparity map of the known view.

13. The hole filling method according to claim 12, wherein the step of synthesizing the disparity map of the virtual view by using the disparity map of the known view comprises:
obtaining at least one disparity map of the known view;
transforming a view of the at least one disparity map into the virtual view; and
synthesizing the at least one disparity map of the transformed view to generate the disparity map of the virtual view.

14. The hole filling method according to claim 13, wherein the step of synthesizing the at least one disparity map of the transformed view to generate the disparity map of the virtual view comprises:
as for each pixel in the disparity map of the virtual view, serving a pixel value of a pixel having a relatively small depth among corresponding pixels in the at least one disparity map as a pixel value of the pixel in the disparity map, wherein when the pixel has no corresponding depth, the pixel is marked as the hole.

15. The hole filling method according to claim 12, wherein the step of filling the holes in the synthesized disparity map of the virtual view comprises:
filling holes in the synthesized disparity map of the virtual view by using a filling information of the disparity map of each of the other virtual views having the distance or the transformed angle smaller than the distance or the transformed angle of the virtual view.

16. The hole filling method according to claim 15, wherein the step of filling holes in the synthesized disparity map of the virtual view by using the filling information of the disparity map of each of the other virtual view having the distance or the transformed angle smaller than the distance or the transformed angle of the virtual view further comprises:
recording the filling information of the holes in the synthesized disparity map of the virtual view into a propagation map.

17. The hole filling method according to claim 16, wherein the step of filling holes in the synthesized disparity map of the virtual view by using the filling information of the disparity map of each of the other virtual view having the distance or the transformed angle smaller than the distance or the transformed angle of the virtual view comprises:
accessing the propagation map recorded when the disparity map of the other virtual view is filled, and filling the filling information in the propagation map into the holes in the synthesized disparity map of the virtual view.

18. The hole filling method according to claim 17, wherein the step of filling holes in the synthesized disparity map of the virtual view by using the filling information of the disparity map of the other virtual view having the transformed angle smaller than the transformed angle of the virtual view further comprises:
filling pixel values of pixels at a depth around the holes into the holes.

19. The hole filling method according to claim 16, wherein the step of recording the filling information of the holes in the synthesized disparity map of the virtual views into the propagation map further comprises:

transforming a view of the propagation map into a predetermined view.

20. The hole filling method according to claim 19, wherein the step of accessing the propagation map recorded when the disparity map of the other virtual view is filled further comprises:

transforming the view of the propagation map into the virtual view to fill the filling information in the transformed propagation map into the holes in the synthesized disparity map of the virtual view.

* * * * *